US008639825B2

(12) United States Patent
Winkler

(10) Patent No.: US 8,639,825 B2
(45) Date of Patent: Jan. 28, 2014

(54) ENTERPRISE-BASED ACCESS TO SHARED RFID DATA

(75) Inventor: Steve Winkler, San Francisco, CA (US)

(73) Assignee: SAP AG, Walldorf (DE)

(*) Notice: Subject to any disclaimer, the term of this patent is extended or adjusted under 35 U.S.C. 154(b) by 1109 days.

(21) Appl. No.: 11/647,143

(22) Filed: Dec. 29, 2006

(65) Prior Publication Data

US 2008/0157931 A1 Jul. 3, 2008

(51) Int. Cl.
*G06F 15/16* (2006.01)

(52) U.S. Cl.
USPC ............... 709/229; 705/22; 705/28; 707/736; 707/754; 707/757; 726/26; 726/27

(58) Field of Classification Search
USPC ...................... 709/200, 217, 229; 705/22, 28; 707/736, 754, 757; 726/26, 27
See application file for complete search history.

(56) References Cited

U.S. PATENT DOCUMENTS 5,577,252 A 11/1996 Nelson et al.
6,901,304 B2 * 5/2005 Swan et al. ................... 700/115
6,941,184 B2 * 9/2005 Ebert ............................ 700/115
7,076,541 B1 7/2006 Burstein et al.
7,089,325 B1 8/2006 Murtza et al.
7,765,253 B1 7/2010 Sarma et al.
2003/0158857 A1 * 8/2003 Weng et al. ................ 707/104.1
2004/0006704 A1 * 1/2004 Dahlstrom et al. ........... 713/200
2004/0254842 A1 12/2004 Kirkegaard
2006/0012805 A1 1/2006 Liu
2006/0218149 A1 * 9/2006 Patrick .............................. 707/9
2006/0235795 A1 10/2006 Johnson et al.
2006/0259977 A1 11/2006 Patrick
2006/0277220 A1 * 12/2006 Patrick et al. ................. 707/200
2006/0293968 A1 12/2006 Brice et al.
2007/0027734 A1 * 2/2007 Hughes ............................. 705/7
2007/0060114 A1 3/2007 Ramer et al.
2007/0109100 A1 5/2007 Jett et al.
2007/0118892 A1 * 5/2007 Sastry et al. .................... 726/10
2007/0299804 A1 12/2007 Liu et al.
2008/0005076 A1 * 1/2008 Payne et al. ........................ 707/3
2008/0040674 A1 * 2/2008 Gupta ........................... 715/745
2008/0098099 A1 * 4/2008 Khasnis et al. ............... 709/222
2008/0109411 A1 * 5/2008 Young et al. ....................... 707/3
2008/0157930 A1 7/2008 Winkler et al.
2008/0157932 A1 7/2008 Winkler
2008/0157933 A1 7/2008 Winkler
2008/0224823 A1 9/2008 Lawson et al.
2009/0222541 A1 * 9/2009 Monga et al. ................. 709/222

OTHER PUBLICATIONS

Office Action issued Jun. 3, 2010 in Co-Pending U.S. Appl. No. 11/647,193 (26 pages).

(Continued)

*Primary Examiner* — Glenton B. Burgess

(74) *Attorney, Agent, or Firm* — Finnegan, Henderson, Farabow, Garrett & Dunner, LLP

(57) ABSTRACT

An electronic product code information service (EPCIS) interface is provided, where the EPCIS interface is capable of allowing one or more accessing applications residing on a variety of systems and associated with a plurality of enterprises to receive EPC-related data. Also provided is an enterprise profile for each enterprise that is allowed to receive the EPC-related data. An enterprise is authenticated based on its enterprise profile. A query is performed to generate a result set that is within an extent permitted by access authorization associated with the authenticated enterprise. The result set is then provided to the EPCIS accessing application of that enterprise.

17 Claims, 8 Drawing Sheets

(56) References Cited

OTHER PUBLICATIONS

Office Action issued Apr. 28, 2010 in Co-Pending U.S. Appl. No. 11/647,194 (11 pages).
Office Action issued Jun. 18, 2010 in Co-Pending U.S. Appl. No. 11/647,357 (28 pages).
Advisory Action, U.S. Appl. No. 11/647,193, mailed Jan. 26, 2011 (3 pages).
Advisory Action, U.S. Appl. No. 11/647,194, mailed Dec. 30, 2010 (3 pages).
Advisory Action, U.S. Appl. No. 11/647,357, mailed Feb. 4, 2011 (3 pages).
Final Office Action, U.S. Appl. No. 11/647,193, mailed Nov. 19, 2010 (31 pages).
Final Office Action, U.S. Appl. No. 11/647,194, mailed Oct. 14, 2010 (11 pages).
Final Office Action, U.S. Appl. No. 11/647,194, mailed Sep. 14, 2011 (10 pages).
Final Office Action, U.S. Appl. No. 11/647,357, mailed Nov. 22, 2010 (30 pages).
Office Action, U.S. Appl. No. 11/647,194, mailed May 9, 2011 (8 pages).
Advisory Action, U.S. Appl. No. 11/647,194, mailed Jan. 4, 2012 (3 pages).
Examiner's Answer, U.S. Appl. No. 11/647,194, mailed Aug. 29, 2012 (11 pages).
Office Action, U.S. Appl. No. 11/647,193, mailed Aug. 17, 2012 (30 pages).
Office Action, U.S. Appl. No. 11/647,357, mailed Aug. 21, 2012 (31 pages).

* cited by examiner

ENTERPRISE-BASED ACCESS TO SHARED RFID DATA

TECHNICAL FIELD

The field of the invention relates in general to radio frequency identification (RFID). More particularly, the field of the invention relates to enterprise based access to sensor-related data such as Electronic Product Code (EPC) data and/or RFID data that is shareable across enterprises.

BACKGROUND

Radio frequency identification (RFID) technology is being used at an expanding rate by manufacturers, retailer, logistics providers, and other users to replace or supplement a variety of traditional systems. Most notably, RFID technology may be implemented as a part of a supply chain management system to facilitate tracking, securing, and managing of items from manufacturing to retail.

In essence, RFID works by enabling a wireless exchange of information between a tagged object and a reader/writer, which in turn allows a host to process the information associated with the tagged object. FIG. 1 shows one example of such an RFID system. Three components are included in this basic RFID system 100. First, one or more tags 102 or transponders may be deposited on an item to be tracked. The item may be any suitable item known to those skilled in the art upon which an RFID tag may be attached, such as retail merchandise. The tags 102 may vary in shapes, sizes, and materials to suit the conditions of the item. Each RFID tag 102 may include two components, a computer chip 106 and an antenna 108. Appropriate information associated with the tagged item, including, for example, item name, description, or any other suitable item-related information, may be stored on the computer chip 106 and/or a server away from the tag.

Depending on the application, the tags 102 may be passive, active, or battery assisted. Passive tags generally utilize the power derived from the signals sent by a reader to respond to the reader. Active tags power their transmissions with an attached battery, while battery-assisted tags use an attached battery to power chip electronics, but does not use the battery for transmission. While the less costly passive tags are most frequently used in connection with supply chain management systems, active tags play a major role in marking shipping contains etc. in the supply chain management systems.

Functionally, tags 102 may fall into two categories, read-only or read/write. Read-only tags are programmed with a fixed set of information during manufacturing, and this information cannot be altered at a later time. Read/write tags on the other hand allow writing and/or rewriting of its information by an authorized user. Some read/write tags may include a read-only portion in which certain information may be stored and protected while allowing other information stored in a writable portion to be modified. Some examples for modifying the read/write tags, for example, to effect tracking of a product from manufacturing to retail, will be discussed in more detail below.

One or more read/write devices or interrogators 110 may be used to communicate with the tags 102. The read/write device 110 may include an antenna 112, a transceiver 114, and any other suitable components for facilitating reading and writing to tags 102. Typically, to communicate with a particular tag or set of tags 102, the read/write device 110 sends out through transceiver 114 and antenna 112 an RF signal in the frequency to which the target tags 102 are tuned. In response to receiving the signal, the targeted tags 102 respond by transmitting at least a part of their stored data. Upon receiving the data transmitted by the tags 102, the reader/writer 110 decodes the data and may transfer the data to a host computer system 116 for processing. The reader/writer 110 may either be fix-positioned or portable and may be either wired or wireless.

An RFID tag often contains data in the form of an Electronic Product Code (EPC). The EPC is essentially a unique serial number that is assigned to the item to which the RFID tag is affixed or otherwise associated. The tag may also contain EPC-related information, i.e., any suitable information that has been associated with the item bearing an EPC.

An RFID system provides many advantages over traditional tracking and inventory systems that utilize code-based technologies (e.g., bar code). Most notably, RFID utilizes radio frequency for communication and therefore may communicate with multiple tags positioned out of sight. In addition, much more information may be stored on an RFID tag, which provides a broad range of opportunities for associating various information with the tracked items. The read/write tags have the added advantage of reusability and modifiability, which reduces replacement cost and allows more accurate and flexible association of information with the tracked items.

In view of the above advantages associated with RFID technology, many enterprises have developed applications for implementing RFID in their various operations. For example, RFID tags may be attached to individual products as they come off the production line at a manufacturer's factory. These tags may contain data such as the date of production, special product care instructions (i.e., a special temperature that the product is to be kept at), and/or any other suitable information that the manufacturer wishes to have associated with the product. The manufacturer may store the tag information in its own database. Scanning of the tags as the products leave the factory, for example, via a tag reader fixed to a door, may inform the manufacturer which products are no longer stored in the factory. This information may be used to update the manufacturer's database, which may in turn allow the manufacturer to monitor, manage, and/or optimize its business, for example, by using the data to assess whether it has been consistently shipping out the oldest products in accordance with its first-in-first-out (FIFO) policy.

This example illustrates one scenario in which RFID data collection, storage, and analysis may be helpful to a manufacturer, for example, for streamlining its operations. Many other scenarios exist where RFID data may be used to optimize, manage, and otherwise benefit an enterprise. Additionally, because today's businesses are interconnected with each other in a plethora of ways, it is quite probable that one enterprise's RFID data may also be very beneficial to other enterprises such as enterprises situated down the supply chain from the manufacturer.

In one particular scenario, an enterprise, acting in the role of a retailer that purchases from the above manufacturer, may wish to gain access to the manufacturer's stored RFID data, including production date and shipped date data. Using this data, the retailer may determine the best time to schedule its quarterly shipment from the manufacturer to ensure that the manufacturer will have enough products on hand to satisfy the retailer's needs.

In another scenario, the enterprise, in its retailer role, may wish to gain access to the manufacturer's stored RFID data, for example, with regard to the special condition that the products have been kept under (i.e., temperature for perishable food). Using this data, the retailer may determine whether an expiration date can be properly applied because the products have been kept according to the manufacturer's special instructions.

On the reverse side, the enterprise in the manufacturer role may wish to analyze the retailer's RFID data, for example, generated from sales made at the cash register, to infer how many products have been sold within a particular period. The manufacturer may use this data to adjust its production schedule to promptly satisfy reorder demands from the retailer.

These examples demonstrate, at a high level, some benefits of RFID data access both within and across enterprises in their various related roles. Many other scenarios exist in which data sharing among a plurality of users acting in a variety of roles within an enterprise and across multiple enterprises could be advantageous for everyone involved.

Many enterprises have realized the power of such data sharing, but few have made it a reality due to the obstacles associated with such sharing. A primary obstacle is an enterprise's concern over proper authorization of an enterprise and/or a particular user within an enterprise that accesses the data. For example, the enterprise acting in a retailer role in the above examples may wish the enterprise acting in a related manufacturer role to see how many of the manufacturer's products are left in the retailer's warehouse to enable the manufacturer to restock automatically. At the same time, the retailer may not wish the manufacturer to gain access to information about what other products are being stored in the retailer's warehouse or sold at its registers.

One way to avoid this problem is for the retailer to modify its database to prevent the manufacturer from seeing some specific groups of data. This approach may work if the sharing is only on a small scale between a limited number of enterprises. The approach is less desirable, however, if the number of enterprises sharing the data and the databases themselves are large because each sharer must be painstakingly assessed, prevented, or allowed to view specific data sets.

Another obstacle for sharing RFID data across enterprises is that data warehousing and data mining are performed very differently from one enterprise to another. It is not uncommon for two enterprises to differ in everything from the type of databases to the type of hardware to the type of network connections they use. Since different hardware and software rarely work together in a cohesive and smooth manner without considerable integration work, RFID data sharing can be difficult from a technical standpoint.

In view of the above, a need exists for an improved way of providing a sensor-related data (e.g., EPC/RFID data) sharing scheme so that enterprises participating in the data sharing scheme may gain access to sensor-related data collected and stored by other enterprises in a seamless fashion. An additional need exists for the data sharing scheme to provide a way to prevent an enterprise from accessing data that has been deemed inappropriate for that enterprise to access by another enterprise who owns the data. A further need exists for the data sharing scheme to maintain a set of consistent sharing rules that may be adopted by each of the participating enterprise to suit its particular sharing needs without having to make specific adjustments with regard to each outside enterprise that it wishes to share data with.

SUMMARY

Consistent with the principles of the present invention, a method and system is provided for allowing a plurality of enterprises to share sensor-related data using a common standard interface while limiting the data shared based on the identities of the enterprises requesting and/or receiving the sensor-related data. It will be understood that while EPC-related data is used throughout the application as the specific example of sensor-related data, any other sensor-related data may be suitable within the spirit of the present invention.

In some embodiments, a standard data sharing service such as an electronic product code information service (EPCIS) interface is provided. It will be understood that while EPCIS is given as the specific example of a data sharing service, any other suitable data sharing service may be used without departing from the spirit of the present invention. The EPCIS interface may be capable of allowing one or more accessing applications residing on a variety of systems and associated with a plurality of enterprises to receive EPC-related data. Also provided is an enterprise profile for each enterprise that is allowed to receive the EPC-related data.

In one suitable approach, an enterprise is authenticated based on its enterprise profile prior to enabling a query to be performed on behalf of one of the EPCIS accessing applications of that enterprise. Once authenticated, the query is performed to generate a result set that is within an extent permitted by access authorization associated with the authenticated enterprise. The result set is then provided to the EPCIS accessing application of that enterprise.

In another suitable approach, a query is performed on behalf of one of the EPCIS accessing application of an enterprise without first authenticating the enterprise. Only after the query has been performed is the enterprise authenticated based on its enterprise profile. Using access authorization associated with the authenticated enterprise, the result of the query is then filtered to generate a result set within an extent permitted by the access authorization. The filtered result set is provided to the EPCIS accessing application.

Further features and embodiments of the present invention will become apparent from the description and the accompanying drawings. It will be understood that the features mentioned above and those described hereinafter may be used not only in the combination specified but also in other combinations or on their own, without departing from the scope of the present invention. It will also be understood that the foregoing background, summary, and the following description of the systems consistent with the principles of the present invention are in no way limiting on the scope of the present invention and are merely illustrations of a preferred embodiment of the present invention.

BRIEF DESCRIPTION OF THE DRAWINGS

Referring now to the drawings, in which like numerals represent like elements throughout the several Figures, aspects of the present invention and the exemplary operating environment will be described.

DETAILED DESCRIPTION

Figure 1:
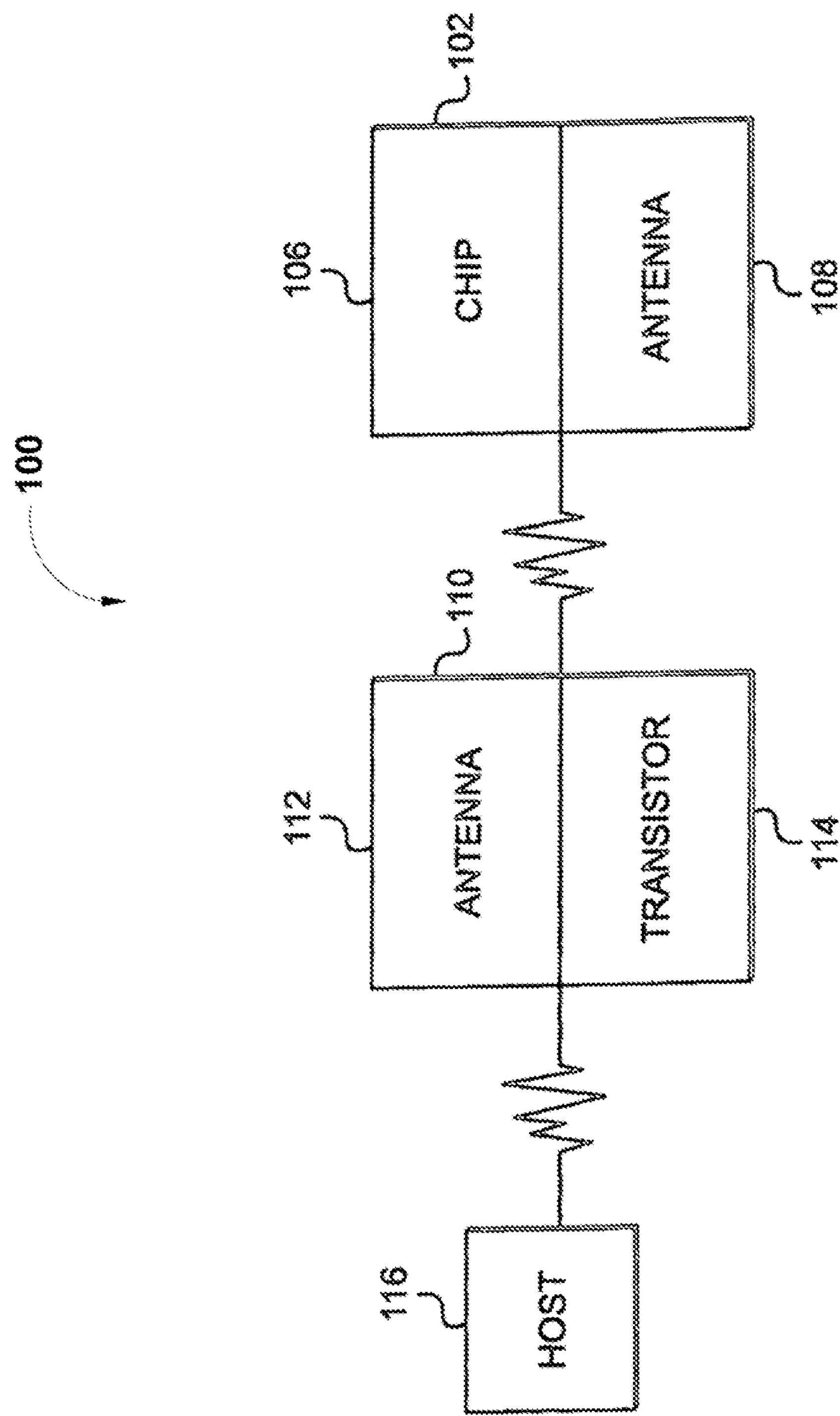
FIG. 1 is a block diagram of an illustrative RFID system for facilitating reading and writing to a read/write RFID tag.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Consistent with the principles of the present invention, a method and system is provided in connection with an Electronic Product Code Information Service (EPCIS) or another suitable service to enable participating enterprises and its associated sub-organizations and/or individuals to share Electronic Product Code-related data (e.g., obtained from RFID tags) through a role-based access scheme. It will be understood that while EPCIS is provided as specific example, any other suitable service based on any other suitable standard may be implemented without departing from the spirit of the present invention.

At a high level, the Electronic Product Code Information Service (EPCIS) specifies a standard interface for accessing EPC-related information. EPC-related information may be any suitable information that has been associated with an object bearing an Electronic Product Code (EPC), which usually involves a unique serial number that is assigned to the object via an RFID tag.

Typically, EPC-related data falls into two broad categories. One category involves timestamped event data that is collected throughout the lifecycle of an object. This type of event data may include, for example, observation data associated with tag readings (e.g., time data associated with scanning of the RFID tag of a product at a retail register), measurement data (such as sensor readings, temperature history, etc.), location history, business transaction history, and any other timestamped event data. Another category of EPC-related data involves attribute data that is, for example, a fixed part of the RFID tag and is not continuously updated. This type of data may include, for example, manufacturing date, expiration date, and any other data that is specific to the product with which the EPC is associated and does not require continuous updating.

Unlike other networks that are concerned with synchronization of data about products (i.e., the GDSN, UCCNet, etc.), EPCIS is primarily focused on sharing of serial-level EPC-related data via a much more distributed architecture. What EPCIS provides is a technical specification for a data communication interface in a model that allows different applications to leverage EPC-related data both within and across enterprises. In particular, the EPCIS enables the capturing and querying of EPC-related data using a defined set of service operations and associated EPC-related data standards, all combined with appropriate security mechanisms that satisfy the needs of user enterprises. In other words, the EPCIS places no restrictions on the different enterprises' underlying database, underlying operating system, underlying programming language, or underlying information system integration.

With regard to the standard interface for accessing the EPC-related data, EPCIS supports both on-demand polling access and a "push" model, which deals with standing queries. Depending on how the security for each individual EPCIS implementation is configured by, for example, an enterprise that owns the particular EPCIS, rights may be granted for a user enterprise of the EPCIS to define its own standing queries or the user enterprise may only have the option of subscribing to an existing query, which, for example, has been pre-defined by the enterprise provider of that particular EPCIS service. In many or most cases, one or more databases of EPC-related data is involved, though elements of the EPCIS could be used for direct application-to-application sharing without persistent databases.

Figure 2:
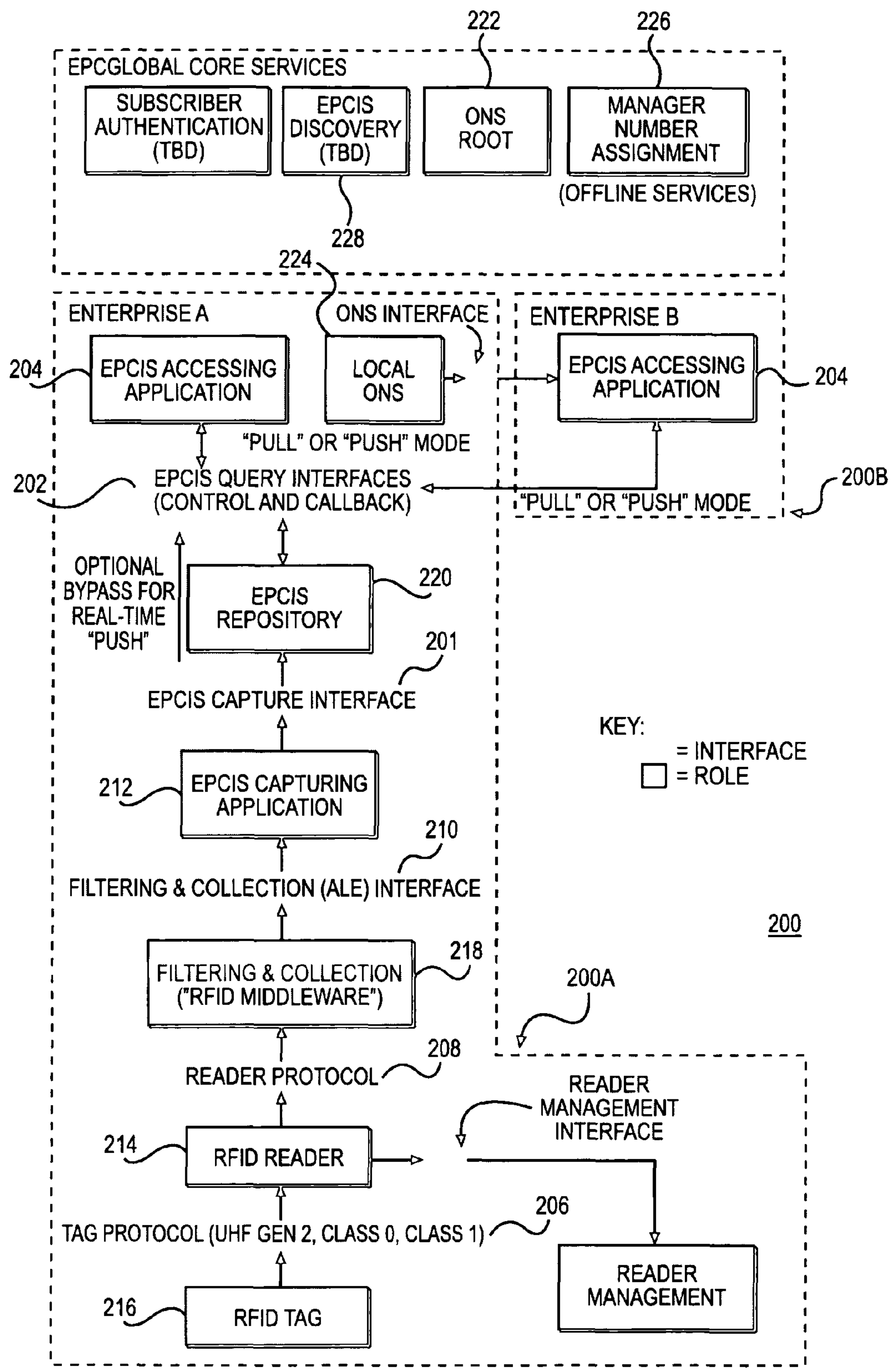
FIG. 2 is a schematic block diagram illustrating the relationships within an EPCglobal Architecture Framework.

FIG. 2 is a schematic block diagram illustrating the relationships within an EPCglobal Architecture Framework 200. EPCglobal generally refers to an organization set up to achieve world-wide adoption and standardization of Electronic Product Code (EPC) technology. The main focus of the EPCglobal Architecture Framework 200 is to create both a world-wide standard for RFID and sharing of EPC-related data via the EPCglobal Network.

In FIG. 2, boxes denote roles played by hardware and/or software components of the system while the bars that have shadows denote interfaces governed by the various standards of EPCglobal, including the EPCIS. EPCglobal Architecture Framework 200 is divided between hardware and software components in Enterprise A, labeled 200A in FIG. 2, and Enterprise B (200B).

The flow of data from an RFID tag 216 in Enterprise A is depicted from the bottom to the top of 200A in FIG. 2. At the base bevel, RFID reader 214 makes one or more observations of RFID tag 216 when RFID tag 216 comes within the read zone of RFID reader 214, for example, when a product bearing RFID tag 216 passes through a warehouse door where RFID reader 214 is mounted. These raw EPC observations are governed by Tag Protocol 206. The raw tag observations made by RFID reader 214 are then delivered in accordance with the definition provided by Reader "Wireline" Protocol Interface 208 to Filtering & Collection 218, which is often referred to as the RFID middleware. The time interval for the collection of the raw tag observations by Filtering & Collection 218 may be determined by, for example, events defined by EPCIS Capturing Application 212. A suitable event may be, for example, the tripping of a motion detector on a product line.

The delivery of the filtered and collected tag read data from Filtering & Collection 218 to EPCIS Capturing Application 212 may be performed according to the control and definition specified by Filtering & Collection Interface 210. EPCIS Capturing Application 212 may supervise the operation of the lower-level architectural elements, for example, by providing filtering criteria to Filtering & Collection 218, and may provide business context by coordinating with other sources of information involved in executing a particular step of a business process. In essence, EPCIS Capturing Application 212 understands the business process steps during which data capture takes place and provides intelligent guidance with regard to what actions to take in connection with the data capture. For example, EPCIS Capturing Application 212, while coordinating a conveyor system with filtering and collection events, may check for exceptional conditions and take corrective action such as diverting a bad batch of products into a rework area.

Above EPCIS Capturing Application 212, at the top portion of EPCglobal Architecture Framework 200 resides the EPCIS Interfaces. These EPCIS Interfaces may include EPCIS Capture Interface 201 and EPCIS Query Interface. The EPCIS Interfaces provide EPC-related data to enterprise-level roles such as EPCIS Repository 220 and EPCIS Accessing Application 204 both inside an enterprise and outside of it, for example, at another enterprise.

The EPCIS interfaces may include three specific interfaces: EPCIS Capture Interface 201, EPCIS Query Interfaces 202, and EPCIS Query Callback Interface, which is shown as a part of Interface 202 in FIG. 2. EPCIS Capture Interface 201 may define the delivery of EPCIS events from EPCIS Capturing Applications 212 to other roles that utilize the event data in real time, including EPCIS Repository 220. EPCIS Repository 220 may in turn store events generated by one or more EPCIS Capturing Applications, and may make these events available for later query, for example, by EPCIS Accessing Applications 204. EPCIS Capture Interface 201 may also "push" data in real time to EPCIS Accessing Applications 204.

EPCIS Query Control Interface 202, on the other hand, defines a means for EPCIS Accessing Application both inside and outside of the enterprise to obtain EPCIS data subsequent to capture, for example, by first interacting with EPCIS Repository 220. Such interactions may take two forms. In the "on-demand" form, an EPCIS Accessing Application 204 may make a request through the EPCIS Query Control Interface 202 and receive a response based on EPC-related data immediately. In "standing request" or "asynchronous" mode, an EPCIS Accessing Application 204 may establish a subscription for a periodic query. Each time the periodic query is executed, the resulting EPC-related data may be delivered or "pushed" to the EPCIS Accessing Application asynchronously via EPCIS Query Callback Interface 202. EPCIS Query Callback interface 202 may also be used to deliver information immediately upon capture, for example, in the form of a "real-time push."

The fact that the EPCIS Interfaces are situated at the top portion of the EPCglobal Architecture Framework has several advantages. First, each of the interfaces in the lower framework levels insulates the higher levels of the framework from being weighed down by unnecessary details of how the lower levels are implemented. As an example, Reader Protocol Interface 208 insulates the higher levels from knowing what RF protocols are in use and/or what reader models are being used. Similarly, Filtering & Collection Interface insulates the higher levels from the design specifics with regard to how tags are sensed. For example, if a particular sensing arrangement is replaced with another, the events collected at Filtering & Collection level 218 should remain the same because of this insulation effect.

At the highest level, EPCIS insulates enterprise applications such as EPCIS Accessing Applications 204 from having to understand the details in a business process. As an example, regardless of how an EPCIS event specifying that a particular situation occurred in a particular pallet was determined, whether by the observation and recordation of a human operator, by filtering of triggered events sent by a reader protocol interface to the Filtering and Collection level, or by any other method, the EPCIS event that is presented, for example, an EPCIS Accessing Application 204, remains unchanged.

The EPCIS Interfaces have a number of similarities to the interfaces at the lower levels of the EPCglobal Architecture Framework. However, the EPCIS Interfaces also differ from the elements at the lower levels of the EGCglobal Architecture Framework in a number of ways.

First, EPCIS works with historical EPC-related data as well as current EPC-related data. This is different from the lower levels of the framework, which are directed to the collection and processing of real-time EPC-related data.

Second, EPCIS works with business contexts and not just raw EPC-related observations. The business contexts provide a suitable lens through which the raw EPC-related observations may be analyzed, for example, to enable intelligent inferences to be made based on the observations within certain business applications. For example, an observation provided by Filtering & Collection 218 may indicate that a particular product bearing an EPC was seen at a particular reader at a particular time. This information while specific, has no business context. At the semantically higher level of the EPCIS, the above observation may be tied into a business context that provides the fact that the reader is located at a warehouse door, where the reader is triggered when new products arrive on a conveyor belt. Using this business context, the above observation may result in the inference that the product bearing the EPC is now stored in the warehouse and ready for shipping to retailers. In this way, the EPCIS incorporates into the event observation an understanding of the business context in which the EPC data were obtained so as to provide intelligent information that is useful in view of that business context. Because EPCIS allows storage of real-time EPC-related data, for example, in an EPCIS Repository 220, event information at the EPCIS level need not be directly tied to specific physical tag observations. For example, the EPCIS may provide inventory information that is generated based on inferences from history data stored within an EPCIS Repository 220.

Additionally, EPCIS is able to operate within a much more diverse network environment when compared to the elements at the lower levels of the EPCglobal Network Architecture Framework. EPCIS's adaptability to a multi-faceted network is particularly valuable when enterprises that have very different systems or network configurations wish to share data. In this regard, the insulation of EPCIS from the various lower levels within the framework, as discussed above, becomes particularly useful in shielding different implementations at the lower levels from accessing applications. In other words, EPCIS incorporates semantic information about business processes into raw EPC data and provides intelligent inferences based on raw and historical EPC data. In this way, EPCIS prevents and insulates applications that query and analyze information provided by EPCIS from understanding the detailed implementations and business processes within an enterprise.

It should be noted that consistent with FIG. 2, EPCIS Accessing Applications 204 may reside either within the same network as the EPCIS Interfaces or within the systems of, for example, another enterprise. In some embodiments, EPCIS Accessing Applications 204 residing within the systems of another enterprise, such as Enterprise B (200B), may be granted access to a subset of the information that is available from an EPCIS Capturing Application 212 or within an EPCIS Repository 220. Details for granting access to a subset of the information via an enterprise based access approach will be discussed in later sections.

Other elements that are complementary to the essential elements of EPCIS may also be included in the EPCglobal Architecture Framework 200. Examples of such elements may include Object Naming Service (ONS) Root 222 and Local ONS 224, which are network services that are used to look up pointers to the EPCIS provided by an enterprise that is responsible for an EPC associated with a product. A search for pointers to such an EPCIS may be based on, for example, an EPC Manager Number such as one assigned by Manager Number Assignment 226 or based on the full Electronic Product Code. Typical utilizations of an ONS may include, for example, a retailer looking up an EPCIS that provides product data from a manufacturer for a product having a given EPC.

EPCIS Discovery 228 may be another complementary element to EPCglobal Architecture Framework 200. At a high level, EPCIS discovery 228 is capable of locating all EPCIS Repositories that may have data associated with a particular EPC. This discovery service is useful, for example, when an accessing application has no idea which EPCIS has EPC-related data that is relevant to a query that it wishes to perform. In one example, a retailer may wish to know the transport history of a product but has no idea which parties have participated in the transportation and storage of the product since the product left the manufacturer.

It should be noted that a single physical software or hardware component may play more than one role consistent with FIG. 2. For example, an enterprise application such as a Warehouse Management System may simultaneously play the role of EPCIS Capturing Application 212, for example, to detect EPCs during product movement at loading time, and the role of EPCIS Accessing Application 204, for example, to analyze EPC-related data for making business decisions.

It should also be noted that FIG. 2 is merely an illustration of a suitable EPCglobal Architecture Framework. Appropriate additions, modifications, and deletions may be incorporated without departing from the spirit of the present invention.

It is apparent from the above description of the general EPCglobal Architecture Framework that EPCIS, which provides a more comprehensive insulation of technical implementations and business processes at the lower level, needs a complementary richer set of access techniques. For example, the incorporation of business context will require that the EPCIS be capable of handling a variety of data types and be flexible enough so that it may be expanded or extended to accommodate new and different business contexts. Also, in anticipation of widely different systems and networks that the EPCIS must adapt to across enterprises, the EPCIS must be structured carefully so as to maintain consistency and interoperability.

With these requirements in mind, the EPCIS may be implemented in accordance with a framework that is layered, extensible, and modular. With regard to being layered, the structure of data in connection with EPCIS may be defined separately from the particulars of data access services and interface protocols. This separation enables the EPCIS data to maintain consistent meaning across the enterprises over time regardless of changes that might be made to the data access services or the interface protocols. This may also enable the separately defined EPCIS data to be used in other frameworks, such as an EDI framework.

Figure 3:
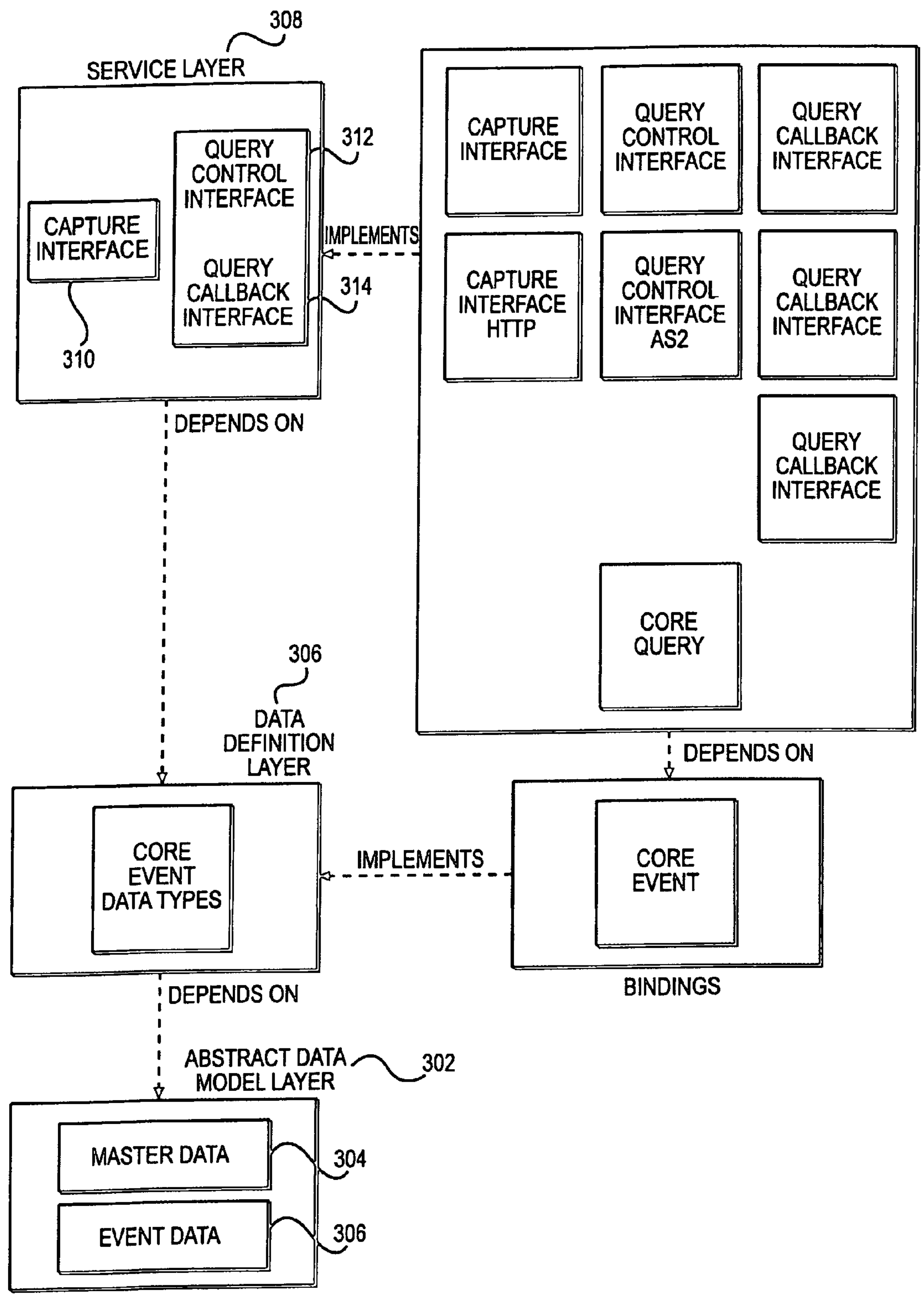
FIG. 3 shows a block diagram of suitable layers that may be implemented in connection with an EPCIS framework.

FIG. 3 shows a block diagram of suitable layers that may be implemented in connection with an EPCIS framework. At the bottom level of this framework lies Abstract Data Model Layer 302. This layer may define the generic structure of EPCIS data and may be made non-extensible without revising the EPCIS core specification. By not allowing extension to be added freely, Abstract Data Model Layer 302 maintains a consistent set of general requirements for creating data definition.

Figure 4:
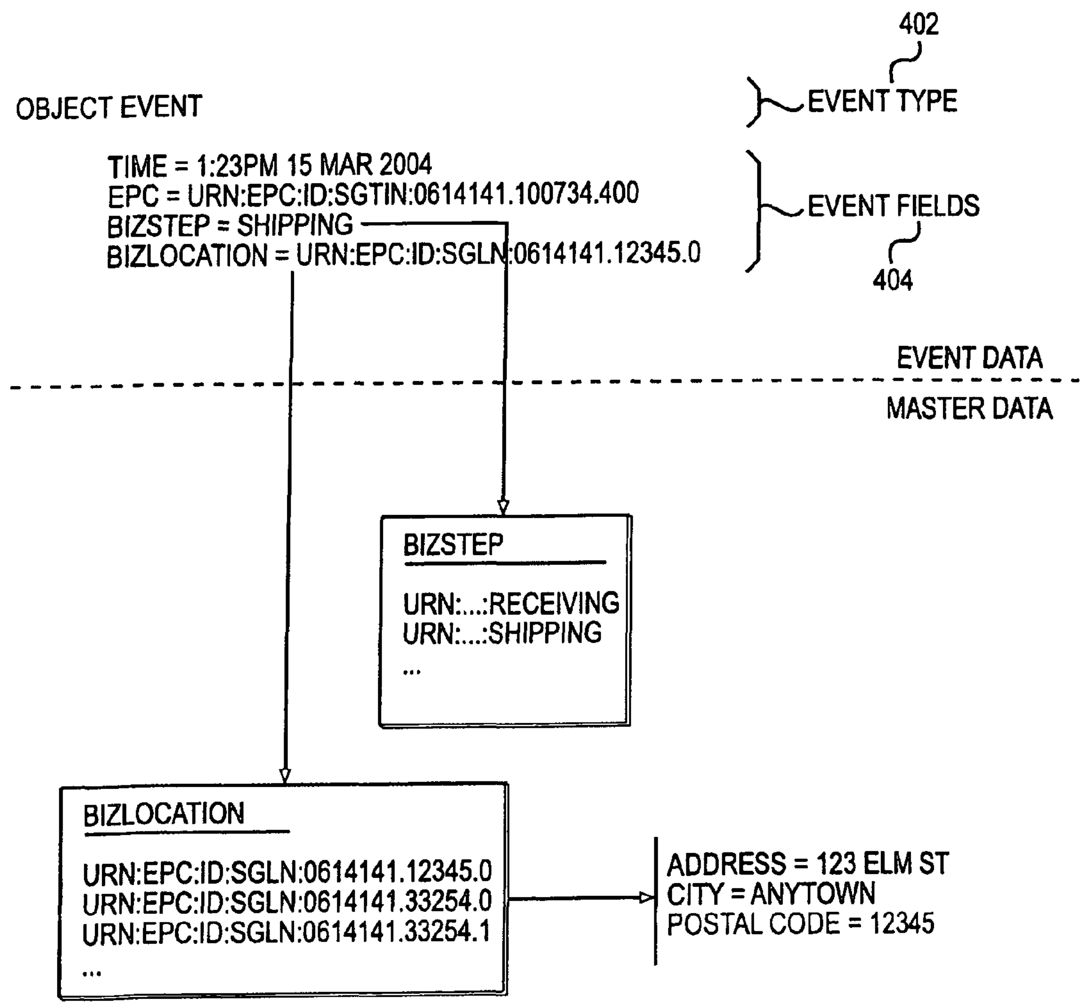
FIG. 4 shows an illustrative set of master data and event data consistent with the EPCIS framework.

Generally, Abstract Data Model Layer 302 may include two types of data: master data 304 and event data 306. Event data 306 may be any suitable data that is generated during the business processes and captured, for example, by an EPCIS Capturing Interface, such as interface 201 of FIG. 2. An example of event data may be a specific observation of an EPC at a particular time by a particular reader. Event data 306 may be made available for querying, for example, through an EPCIS Query Interface, such as interface 202 of FIG. 2. An illustrative set of event data is shown in the top portion of FIG. 4. In this example, the event data describes a specific EPC that has been observed at a specific bizLocation at a specific time during a shipping step.

Master data 304 does not deal with actual observations of events, but is additional data that defines a business context for interpreting the event data. As an example, master data 304 may include identifiers for locations, business process steps, and other business context that can provide business meaning to the raw observations contained in event data 306. An illustrative set of master data is shown in the bottom portion of FIG. 4. In this example, the master data lays out all the possible bizSteps from which the shipping step was chosen and all the possible BizLocations from which the actual BizLocation in the event data was chosen, and how those BizLocations may correspond to actual locations.

Referring back to FIG. 3, Data Definition Layer 306 may be found above Abstract Data Model Layer 302. Data Definition Layer 306 may define at a higher level what data is allowed to be exchanged through EPCIS, what type of abstract structure this data should take on, and what the data means. Data definitions made in Data Definition Layer 306 conform to the set of rules specified in Abstract Data Model Layer 302 below. As an example, event types, as illustrated by event type 402 in FIG. 4, may be defined in Data Definition Layer 306 and may specify a list of standard event fields 404 for each event type. An event type may also include other subclass event types. The event types 402 defined may be consistent with the rules associated with raw event data 306 specified in Abstract Data Model Layer 302.

Service Layer 308 may be found above Data Definition Layer 306 in FIG. 3. This layer defines the service interfaces that clients of EPCIS interact with. According to one suitable approach, the interface definitions in the service layer may be specified abstractly using UML. Some illustrative interfaces that may be defined in this layer may include, for example, EPCIS Capture Interface 310, EPCIS Query Control Interface 312, and EPCIS Callback Interface 314.

In addition to being layered, the core specifications of the EPCIS, which may include, for example, various data types and operations that are applicable across enterprises, may be made extensible to include other data types, operations, etc. that are particular to a particular enterprise or industry. This ability to make additions to the core specifications strengthens the concept of a more standardized core, because it allows particularities that do not conform to the standard core to be included as extensions. The layering and extensibility mechanisms allow different parts of the EPCIS to be specified by different documents and at the same time promote coherence across the entire framework to ensuring standardization.

Figure 5:
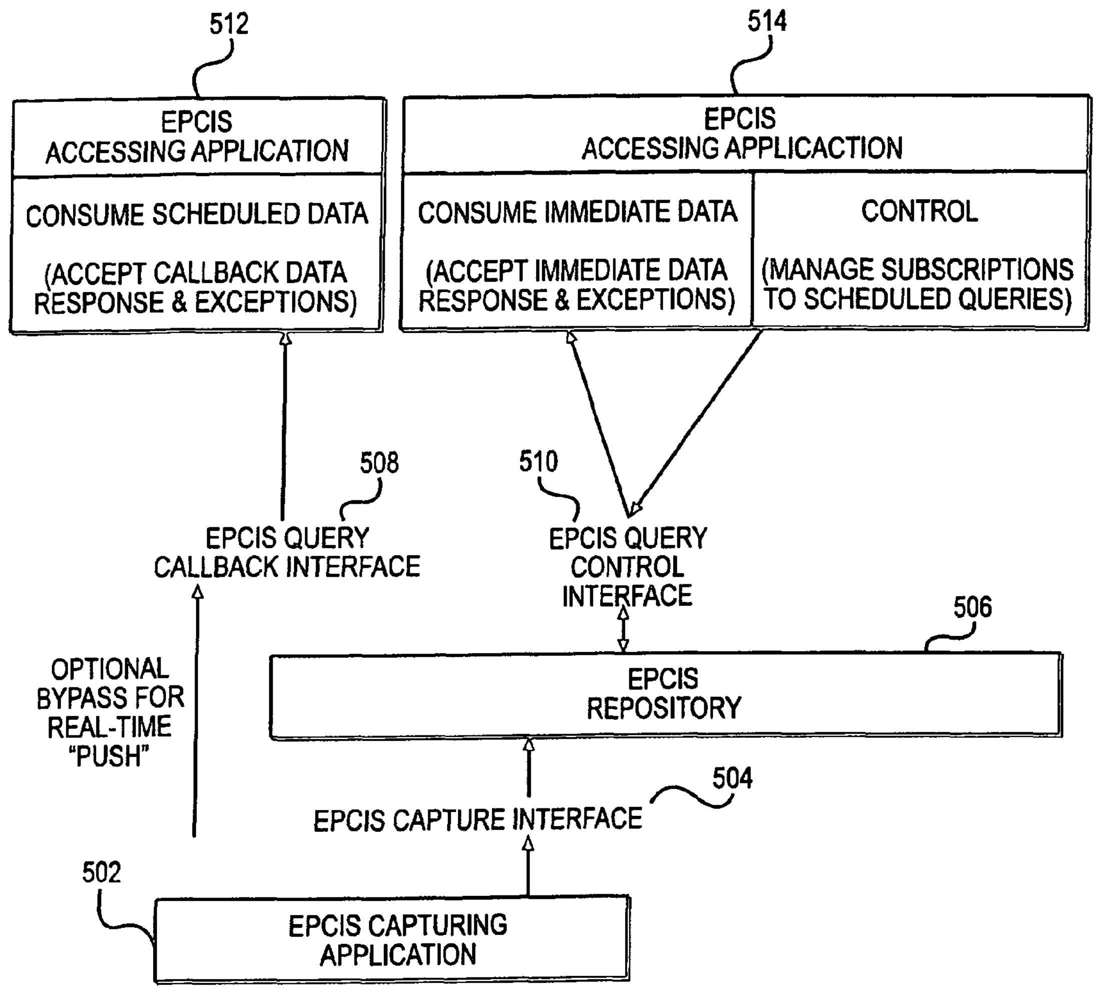
FIG. 5 is a block diagram of one suitable arrangement for allowing EPCIS interfaces to interact with each other and with EPCIS accessing applications.

On a more specific level, FIG. 5 provides a block diagram of one suitable arrangement for allowing the EPCIS interfaces to interact with each other and with EPCIS accessing applications. At the lower level, EPCIS Capture Application 502 may deliver core events to EPCIS Capture Interface 504. A capture operation may be permitted or prevented based on the success of the mutual authentication. As an example, "message bus" technology may be used by EPCIS Capture Interface 504 to interconnect different distributed system components and provide a channel for in-order delivery of messages by designating a particular message bus channel, for example, to deliver EPCIS events from an EPCIS Capture Application 502 to EPCIS Repository 506.

EPCIS Query Callback Interface 508 and EPCIS Query Control Interface 510 may enable EPCIS data to be retrieved by EPCIS Accessing Applications 512 and 514. In particular, EPCIS Query Control Interface 510 allows EPCIS Accessing Application to retrieve data on-demand and to enter subscriptions for standing queries, which may be any suitable queries that are pre-determined and run, for example, periodically or in response to certain triggering events, to return EPCIS data. Results of such standing queries may be delivered to EPCIS Accessing Application 512 via EPCIS Query Callback Interface 508. Similar to the authentication performed at the EPCIS Capture Interface level, means may be provided, for example, for a requesting EPCIS Accessing Application 512 or 514 to be authenticated through EPCIS Query Control Interface 510 or EPCIS Query Callback Interface 508. Once authenticated, EPCIS Accessing Application 514 may gain access to EPCIS data through an EPCIS interface based on the appropriate authorization associated with EPCIS Accessing Application 514.

As previously noted, an EPCIS service may wish to restrict access by, for example, another enterprise, to a subset of the totality of information available. In restricting the access, EPCIS may, for example, refuse to perform a requested query. In some embodiments, EPCIS may perform the query, but may respond to the requesting EPCIS Accessing Application with less than the full set of data generated by the query. In some embodiments, EPCIS may respond with less detailed results than what the query could actually generate if no authorization restrictions were in place. In some embodiments, EPCIS may hide or redact some of the information in the query result before delivering it to the requesting EPCIS Accessing Application.

Figure 6:
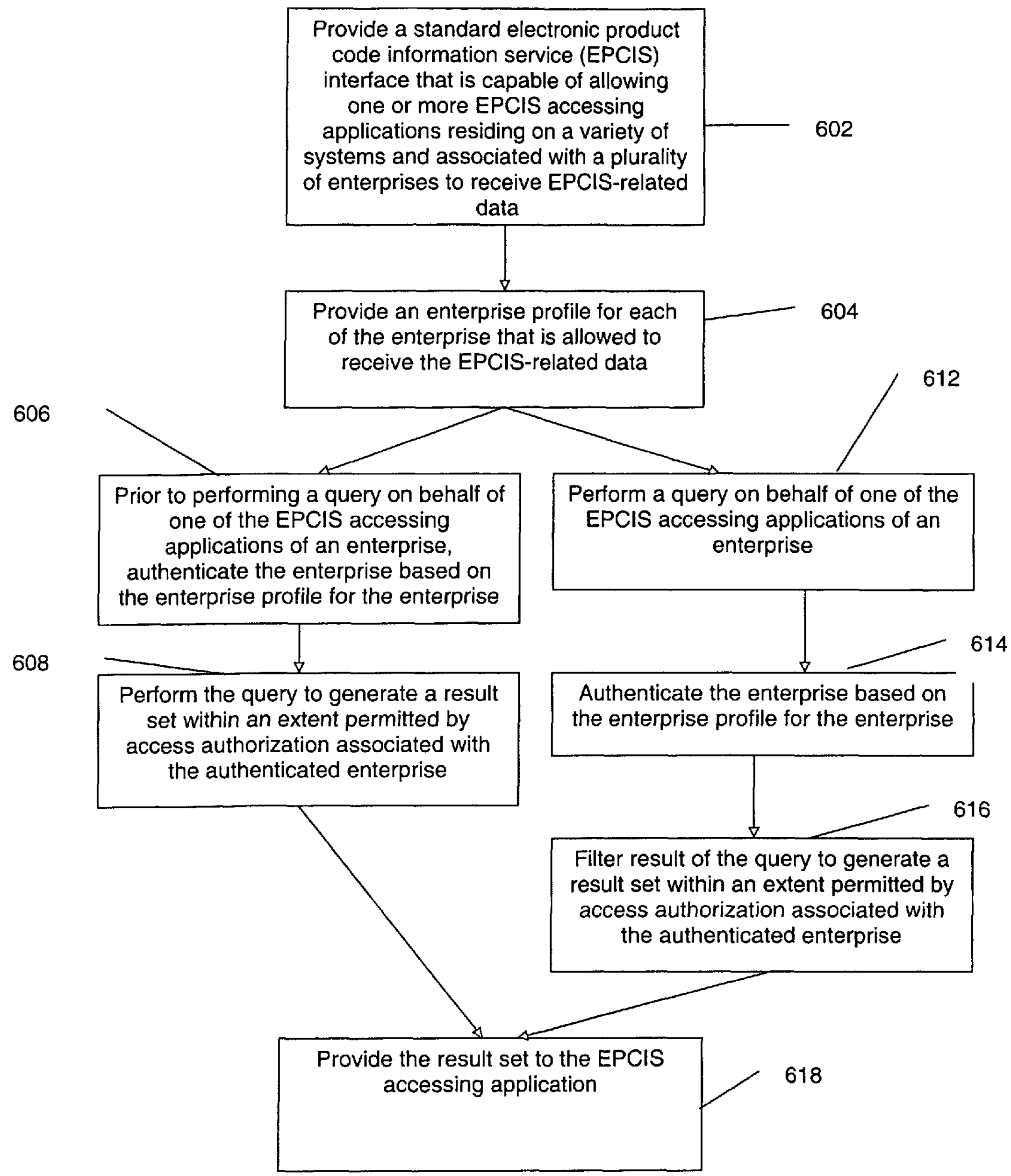
FIG. 6 shows a flowchart of suitable stages involved in providing restricted access to EPC-related data via an EPCIS interface according to an enterprise-based access approach.

FIG. 6 shows a flowchart of suitable stages involved in providing restricted access to EPC-related data via EPCIS according to an enterprise-based access approach. At stage 602, an EPCIS interface, such as interfaces 201 and 202 of FIG. 2, may be provided to allow one or more EPCIS accessing applications residing on a variety of systems and associated with a plurality of enterprises to receive EPC-related data.

Similarly, the EPC-related data for accessing may also be owned by a plurality of enterprises and hosted on a variety of systems. The EPCIS interface may act as a bridge, which connects the diverse systems both inside and outside of an enterprise and enables data exchange in a seamless fashion using standard rules that each system understands. In many instances, an enterprise may wish only to share a subset of all of its available EPC-related data with another enterprise. One approach to address this enterprise-based differentiation may be to first enable identification of each of the enterprises, for example, by providing each enterprise participating in the data sharing with an enterprise profile, such as shown at stage 604.

The enterprise profile may contain information including, for example, enterprise name, enterprise roles such as supplier, distributor, retailer, etc., authorization levels, authorized users, associated EPCs, and any other enterprise-specific data. In one approach, the authorization levels may reflect what level of access the enterprise may have of another enterprise's EPC-related data. In some embodiments, the authorization may vary within an enterprise, for example, depending on the particular role of a user accessing the data. Any other authorization levels may be assigned to an enterprise without departing from the principles of the present invention.

At stage 606, an enterprise may be authenticated based on its associated profile, for example, when one of its EPCIS accessing application attempts to obtain EPC-related data through an EPCIS interface from another enterprise. The attempt to obtain EPC-related data may be made, for example, in the form of a new query, in the form of a standing query, or in any other suitable request form. The authentication at stage 606 may be performed based on any conventional authentication methods. For example, special keys may be associated with the authenticating enterprise's profile, based on which the enterprise's identity may be confirmed. More importantly, regardless of the specific implementation of the authentication process, the process may enable the identification of the enterprise's profile from which authorization for data access may be determined. In some embodiments, the authentication process may be implemented in such a way as to encompass the authorization process. In other words, the authentication itself may be sufficient to provide an appropriate level of authorization.

Once the appropriate level of authorization for the particular enterprise is determined, the EPCIS interface may perform the requested query to generate a result set that remains within an extent permitted by access authorization associated with the authenticated enterprise. As an example, the authenticated enterprise may be a supplier, whose authorization provides that it is allowed to obtain EPCIS data associated only with the supplier's own products. The requested query sent to a retailer selling the supplier's products may be to obtain information on all sales made at the retailer's location for a particular date. In view of the supplier's authorization, the query may be performed to the extent to only generate a result set that includes sales made at the retailer's location of the supplier's products for a particular date.

In some embodiments, the authorization levels may be standard across the different enterprises, for example, based on roles such as supplier, retailer, transporter, etc. The authorization level may be made modifiable, for example, by an enterprise giving accessing permission to its own data by another enterprise. Any other way of providing authorization levels to an enterprise may be implemented without departing from the spirit of the present invention.

When the appropriate result set has been generated, the result set may be provided to the EPCIS accessing application from the requesting enterprise at stage 618. Because the EPCIS interface provides access to appropriate EPC-related data that is deemed as being allowable for access by another enterprise in a seamless fashion without also providing transparency to restricted information, both enterprises may share information that each feels comfortable sharing without having to make very specific customized adjustments to its own system.

An alternative way of providing the permitted access to a subset of an enterprise's information by another enterprise is also shown in FIG. 6. According to this alternative way, the query for EPC-related data by an EPCIS accessing application may be performed to its full extent at stage 612. Only after the query is performed does authentication of the requesting enterprise take place at stage 614. The authentication process at stage 614 may be the same as discussed above in connection with authentication at stage 606. Based on the authorization associated with the authenticated enterprise, as explained above at stage 606, the result of the query may be filtered to generate a result set that is within an extent permitted by access authorization associated with the authenticated enterprise.

The filtering of the result from the query may involve redacting EPCIS data that is not permitted to be shown to the authenticated enterprise, making the result more high level and less detailed, removing a part of the result, or any other suitable filtering methods. At stage 618, the filtered result set may be provided to the EPCIS accessing application of the authenticated enterprise.

A computer system may be used to install a software application implementing a system and method for providing EPCIS interfaces capable of allowing one or more EPCIS accessing applications residing on a variety of systems and associated with a plurality of enterprises to receive EPC-related data. The computer system may be a computer network, as shown in FIG. 7, or a stand-alone personal computer (PC), as shown in FIG. 8.

Figure 7:
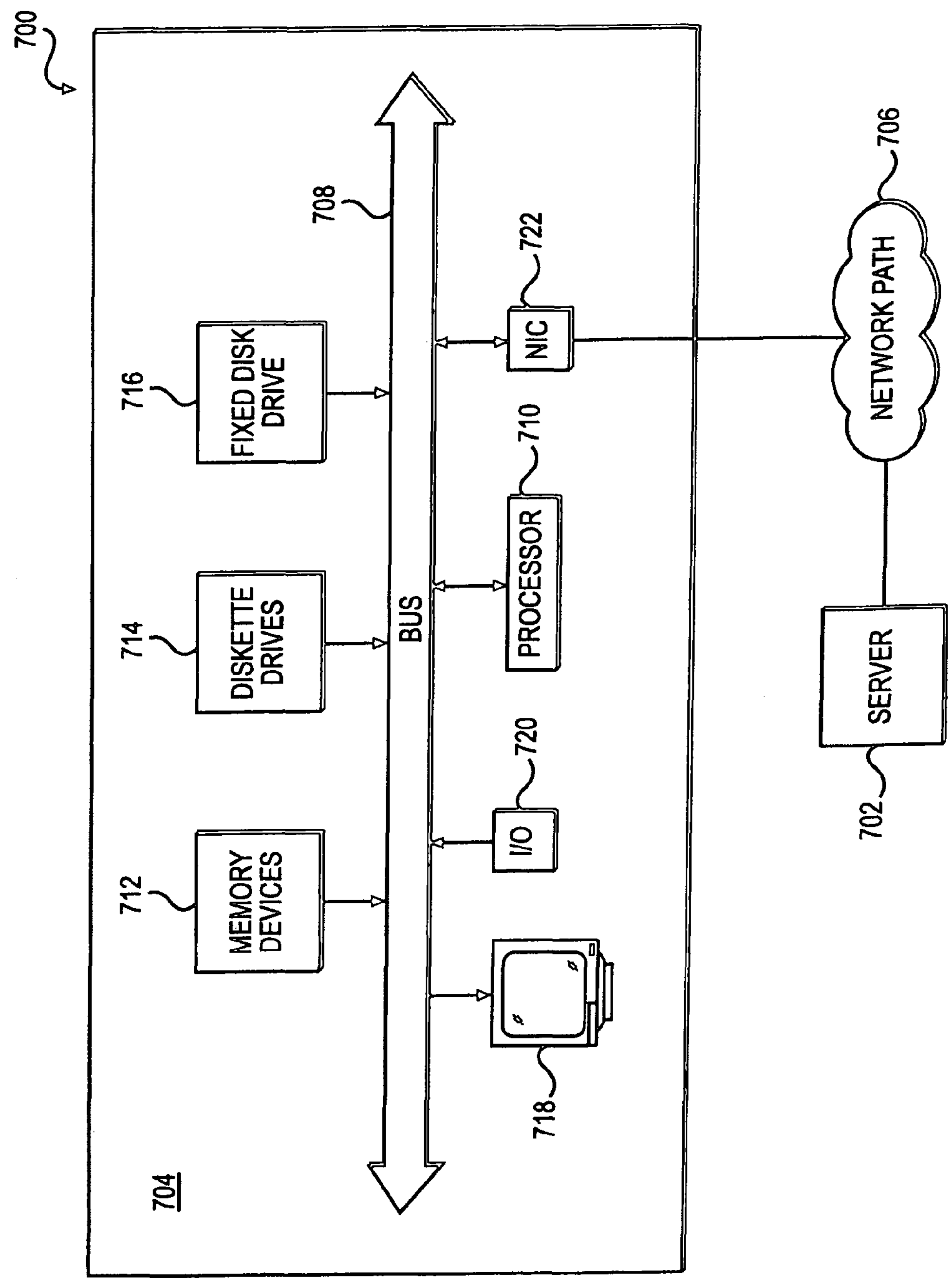
FIG. 7 shows a computer system capable of implementing elements of the EPCIS framework.
Figure 8:
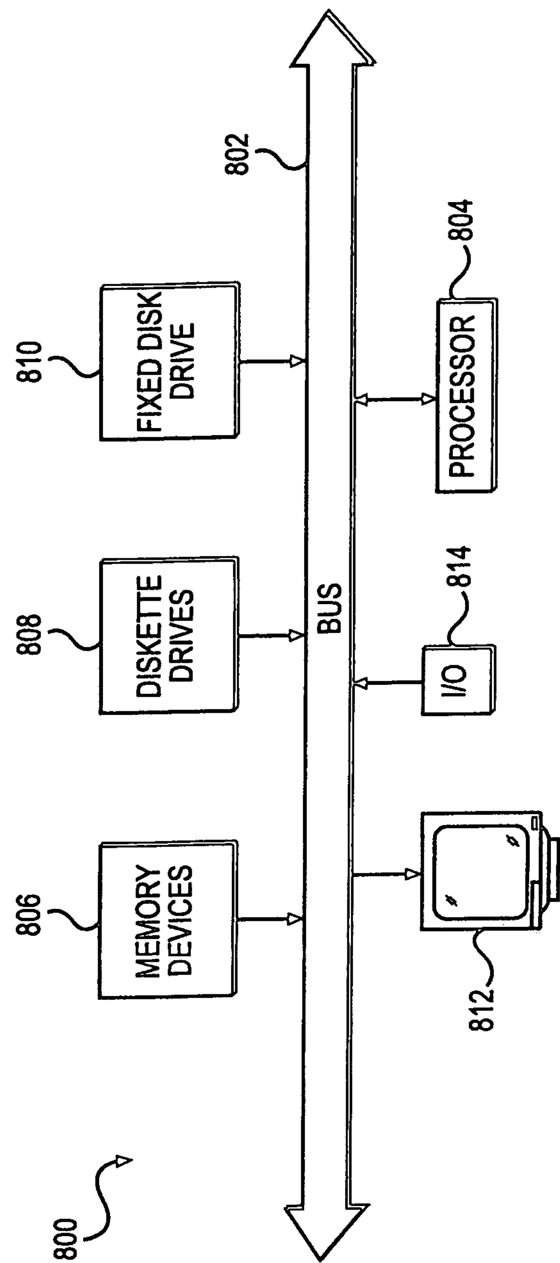
FIG. 8 shows another computer system capable of implementing elements of the EPCIS framework.

As shown in FIG. 7, a computer network 700 in accordance with systems consistent with the principles of the present invention may include a server 702 and a stand-alone PC 704 connected through a network path 706. Computer network 700 may be a local area network (LAN), where server 702 and PC 704 are workstations. Computer network 700 may also be the Internet, with server 702 hosting a web application and PC 704 being any workstation available to a user desiring to interface with the application on server 702. Alternatively, computer network 700 may be a wide area network (WAN), and server 702 and PC 704 may lie in two separate LANs connected through the Internet.

PC 704 may include a bus line 708 connecting a plurality of devices such as a processor 710, memory devices 712 for storage of information, diskette drives 714, a fixed disk drive 716, a monitor or display 718, other I/O devices 720, and a network interface card (NIC) 722. Processor 710 may be a microprocessor such as an Intel Pentium™ chip for processing applications. Memory devices 712 may include read-only memories (ROM) and/or random access memories (RAM). Diskette drives 714 may include a floppy drive and/or a compact disk (CD) drive. Fixed disk drive 716 may be a hard drive. I/O devices 720 may include a keyboard and/or a mouse for receiving input from a user of PC 704. Monitor or display 718 may display output from processor 710, and may also echo the input of the user. PC 704 may be connected to network path 706 through NIC 722.

A web application may be installed on server 702. An individual desiring to enter data into the application on server 702 may use a web browser loaded on PC 704, and may communicate with server 702 through NIC 722 and network path 706. In one aspect, software application for implementing a system consistent with the principles of the present invention may be stored in PC 704 and processor 710 of PC 704 may execute the software application locally within PC 704 and interface with a web application on server 702. Particularly, the software application may be stored on a floppy disk, a CD, or any other suitable readable media, which may be accessible by diskette drive 714, fixed disk drive 716, or any other suitable mechanism. In another aspect, the software application for implementing a system consistent with the principles of the present invention may be stored in server 702, which may execute the software application, and processor 710 of PC 704 may communicate with server 702 to send information to server 702 and retrieve the results of the execution of the software application from server 702.

Through the execution of the software application implementing a system consistent with the principles of the present invention, either locally within PC 704 or remotely within server 702, an interface or screen may be provided on a user display.

Alternatively, as shown in FIG. 8, a stand-alone PC 800 may be used for implementing a software application implementing a system consistent with the principles of the present invention. PC 800 may include a bus line 802 connecting a plurality of devices, which may include a processor 804, memory devices 806 for storage of information, diskette drives 808, a fixed disk drive 810, a monitor or display 812, and other I/O devices 814. Processor 804 may be a microprocessor such as an Intel Pentium™ chip for processing applications. Memory devices 806 may include ROM and/or RAM. Diskette drives 808 may include a floppy drive and/or a compact disk (CD) drive. Fixed disk drive 810 may be a hard drive. Monitor or display 812 may display the output of processor 804 and may also echo the input of the user. I/O devices 814 may include a keyboard and/or a mouse for receiving input from a user of PC 800.

A software application implementing a system consistent with the principles of the present invention may be stored on a floppy disk or a CD accessible by diskette drive 808 or on fixed disk drive 810. Processor 804 may execute the software application stored in the floppy disk the CD or the fixed disk drive 810. An individual, through monitor or display 812 and I/O devices 814, may interact with processor 804, which may execute the software application. A software application implementing a system consistent with the principles of the present invention may be written in any number of programming languages, including but not limited to JavaScript, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for providing enterprise-based data access to Electronic Product Code (EPC)-related data, comprising:

providing an Electronic Product Code Information Service (EPCIS) interface that allows one or more accessing applications residing on a variety of systems and associated with a plurality of enterprises to receive EPC-related data;

providing an enterprise profile for each enterprise allowed to receive the EPC-related data, wherein each enterprise profile describes a different enterprise and each enterprise is described by only one enterprise profile, such that there is a one-to-one correspondence between enterprises and enterprise profiles, and further wherein each enterprise profile identifies an enterprise name, at least one authorized user, and all available EPC-related data associated with the enterprise;

receiving, from one of the accessing applications of a requesting enterprise of the plurality of enterprises, a request for EPC-related data;

authenticating the requesting enterprise based on its enterprise profile, wherein authenticating comprises determining an access authorization level based on the enterprise profile associated with the requesting enterprise, wherein the access authorization level is modifiable by at least one of the plurality of enterprises that grants the requesting enterprise permission to access its data;

generating a result set including a subset of the available EPC-related data identified in the enterprise profile within an extent permitted by the access authorization level associated with the requesting enterprise by at least one of:

querying the EPC-related data after determining the access authorization level, wherein the query is based on the determined access authorization level; and querying the EPC-related data before determining the access authorization level and then filtering the result of the query based on the access authorization level; and providing, via the EPCIS interface, the result set to the accessing application.

2. The method of claim 1, wherein filtering the result of the query comprises redacting at least a portion of the result set.

3. The method of claim 1, wherein filtering the result of the query comprises removing at least a portion of the result set.

4. The method of claim 1, wherein filtering the result of the query comprises making the result set more high level than the result of the query.

5. The method of claim 1, wherein the method further comprises providing the accessing application with a discovery service configured to locate at least one source of EPC-related data relevant to the request from the accessing application.

6. The method of claim 1, wherein the method further comprises implementing a push model, wherein providing the result set responds to a standing query associated with the accessing application.

7. A system for providing enterprise-based data access to Electronic Product Code (EPC)-related data, comprising:

a memory; and a computer processor programmed to:

provide an Electronic Product Code Information Service (EPCIS) interface that allows one or more accessing applications residing on a variety of systems and associated with a plurality of enterprises to receive EPC-related data;

provide an enterprise profile for each enterprise allowed to receive the EPC-related data, wherein each enterprise profile describes a different enterprise and each enterprise is described by only one enterprise profile, such that there is a one-to-one correspondence between enterprises and enterprise profiles, and further wherein each enterprise profile identifies an enterprise name, at least one authorized user, and all available EPC-related data associated with the enterprise;

receive, from one of the accessing applications of a requesting enterprise of the plurality of enterprises, a request for EPC-related data;

authenticate the requesting enterprise based on its enterprise profile, wherein authenticating comprises determining an access authorization level based on the enterprise profile associated with the requesting enterprise, wherein the access authorization level is modifiable by at least one of the plurality of enterprises that grants the requesting enterprise permission to access its data;

generate a result set including a subset of the available EPC-related data identified in the enterprise profile within an extent permitted by the access authorization level associated with the requesting enterprise by at least one of:

querying the EPC-related data after determining the access authorization level, wherein the query is based on the determined access authorization level; and querying the EPC-related data before determining the access authorization level and then filtering the result of the query based on the access authorization level; and provide, via the EPCIS interface, the result set to the accessing application.

8. The system of claim 7, wherein filtering the result of the query comprises redacting at least a portion of the result set.

9. The system of claim 7, wherein filtering the result of the query comprises removing at least a portion of the result set.

10. The system of claim 7, wherein filtering the result of the query comprises making the result set more high level than the result of the query.

11. The system of claim 7, wherein the processor is further configured to provide the accessing application with a discovery service configured to locate at least one source of EPC-related data relevant to the request from the accessing application.

12. The system of claim 7, wherein the processor is further configured to implement a push model, wherein providing the result set responds to a standing query associated with the accessing application.

13. A non-transitory computer-readable medium including instructions for performing, when executed by a processor, a method for providing enterprise-based data access to Electronic Product Code (EPC)-related data, the method comprising:

providing an Electronic Product Code Information Service (EPCIS) interface that allows one or more accessing applications residing on a variety of systems and associated with a plurality of enterprises to receive EPC-related data;

providing an enterprise profile for each enterprise allowed to receive the EPC-related data, wherein each enterprise profile describes a different enterprise and each enterprise is described by only one enterprise profile, such that there is a one-to-one correspondence between enterprises and enterprise profiles, and further wherein each enterprise profile identifies an enterprise name, at least one authorized user, and all available EPC-related data associated with the enterprise;

receiving, from one of the accessing applications of a requesting enterprise of the plurality of enterprises, a request for EPC-related data;

authenticating the requesting enterprise based on its enterprise profile, wherein authenticating comprises determining an access authorization level based on the enterprise profile associated with the requesting enterprise, wherein the access authorization level is modifiable by at least one of the plurality of enterprises that grants the requesting enterprise permission to access its data;

generating a result set including a subset of the available EPC-related data identified in the enterprise profile within an extent permitted by the access authorization level associated with the requesting enterprise by at least one of:

querying the EPC-related data after determining the access authorization level, wherein the query is based on the determined access authorization level; and querying the EPC-related data before determining the access authorization level and then filtering the result of the query based on the access authorization level; and providing, via the EPCIS interface, the result set to the accessing application.

14. The non-transitory computer-readable medium of claim 13, wherein the method further comprises filtering the result of the query comprises redacting at least a portion of the result set.

15. The non-transitory computer-readable medium of claim 13, wherein the method further comprises filtering the result of the query comprises removing at least a portion of the result set.

16. The non-transitory computer-readable medium of claim 13, wherein the method further comprises filtering the result of the query comprises making the result set more high level than the result of the query.

17. The non-transitory computer-readable medium of claim 9, wherein the method further comprises providing the accessing application with a discovery service configured to locate at least one source of EPC-related data relevant to the request from the accessing application.

* * * * *